United States Patent
Wang

(10) Patent No.: US 12,192,369 B2
(45) Date of Patent: Jan. 7, 2025

(54) SYSTEM AND METHOD TO SECURE CONTENT AND IMPROVE COLLABORATION WITH ELECTRONIC PEN

(71) Applicant: Dell Products L.P., Round Rock, TX (US)

(72) Inventor: Kai Wang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 485 days.

(21) Appl. No.: 17/375,412

(22) Filed: Jul. 14, 2021

(65) Prior Publication Data

US 2022/0407708 A1  Dec. 22, 2022

(30) Foreign Application Priority Data

Jun. 18, 2021 (CN) .......................... 202110682891.3

(51) Int. Cl.
*H04L 9/32* (2006.01)
*G06F 3/0354* (2013.01)
*G06V 40/12* (2022.01)

(52) U.S. Cl.
CPC ........ *H04L 9/3231* (2013.01); *G06F 3/03545* (2013.01); *G06V 40/1365* (2022.01); *H04L 9/3239* (2013.01); *H04L 9/3247* (2013.01); *H04L 9/3297* (2013.01)

(58) Field of Classification Search
None
See application file for complete search history.

(56) References Cited

U.S. PATENT DOCUMENTS

| | | | | |
|---|---|---|---|---|
| 8,370,632 B2* | 2/2013 | Lehwany | ................ | G06F 21/64 713/176 |
| 11,227,060 B1* | 1/2022 | John | ..................... | G06F 21/606 |
| 11,764,971 B1* | 9/2023 | Griffin | .................. | H04L 9/3297 713/176 |
| 2018/0219681 A1* | 8/2018 | Geiman | ................ | H04L 9/3231 |
| 2019/0289017 A1* | 9/2019 | Agarwal | ............... | H04L 9/0643 |

(Continued)

FOREIGN PATENT DOCUMENTS

AU        2013309716 A1 *  1/2015  ......... G06F 3/03545

OTHER PUBLICATIONS

Dr. Watson Biometric Authentication and Security, https://www.anoto.com/solutions/dr-watson/, accessed on Jul. 14, 2021.

*Primary Examiner* — Bassam A Noaman
(74) *Attorney, Agent, or Firm* — Jackson Walker L.L.P.

(57) ABSTRACT

An information handling system may include at least one processor; and a computer-readable medium having instructions thereon that are executable by the at least one processor for: communicatively coupling to an electronic pen; receiving, from the electronic pen, stroke data indicative of content drawn by the user with the electronic pen; receiving, from the electronic pen, biometric data associated with a user of the electronic pen, wherein the biometric data is collected via one or more grip pads of the electronic pen contemporaneously with the content being drawn; receiving, from the electronic pen, timestamp data indicative of a time at which the content was drawn; and creating a cryptographic hash based on the stroke data, the biometric data, and the timestamp data.

12 Claims, 2 Drawing Sheets

(56) References Cited

U.S. PATENT DOCUMENTS

| | | | |
|---|---|---|---|
| 2019/0303644 A1* | 10/2019 | Lee | G06V 10/46 |
| 2020/0117771 A1* | 4/2020 | Bae | H04L 9/3234 |
| 2021/0216185 A1* | 7/2021 | Ferris | G06V 30/347 |

* cited by examiner

SYSTEM AND METHOD TO SECURE CONTENT AND IMPROVE COLLABORATION WITH ELECTRONIC PEN

TECHNICAL FIELD

The present disclosure relates in general to information handling systems, and more particularly to securing content via the use of an input device such as an electronic pen.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Electronic pens (also referred to herein as "active pens") are a popular input method for some information handling systems. Various issues exist with current solutions, however. Embodiments of this disclosure may improve on current solutions in many ways, as discussed herein.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with securing content with electronic pens may be reduced or eliminated.

In accordance with embodiments of the present disclosure, an information handling system may include at least one processor; and a computer-readable medium having instructions thereon that are executable by the at least one processor for: communicatively coupling to an electronic pen; receiving, from the electronic pen, stroke data indicative of content drawn by the user with the electronic pen; receiving, from the electronic pen, biometric data associated with a user of the electronic pen, wherein the biometric data is collected via one or more grip pads of the electronic pen contemporaneously with the content being drawn; receiving, from the electronic pen, timestamp data indicative of a time at which the content was drawn; and creating a cryptographic hash based on the stroke data, the biometric data, and the timestamp data.

In accordance with these and other embodiments of the present disclosure, an electronic pen apparatus may include a body portion; a tip portion; and one or more grip pads disposed on the body portion; wherein the electronic pen apparatus is configured to: couple to an information handling system; transmit, to the information handling system, stroke data indicative of content drawn by the user with the electronic pen; transmit, to the information handling system, biometric data associated with a user of the electronic pen, wherein the biometric data is collected via one or more grip pads of the electronic pen contemporaneously with the content being drawn; and transmit, to the information handling system, timestamp data indicative of a time at which the content was drawn.

In accordance with these and other embodiments of the present disclosure, an article of manufacture may include a non-transitory, computer-readable medium having computer-executable code thereon that is executable by a processor of an information handling system for: communicatively coupling to an electronic pen; receiving, from the electronic pen, stroke data indicative of content drawn by the user with the electronic pen; receiving, from the electronic pen, biometric data associated with a user of the electronic pen, wherein the biometric data is collected via one or more grip pads of the electronic pen contemporaneously with the content being drawn; receiving, from the electronic pen, timestamp data indicative of a time at which the content was drawn; and creating a cryptographic hash based on the stroke data, the biometric data, and the timestamp data.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
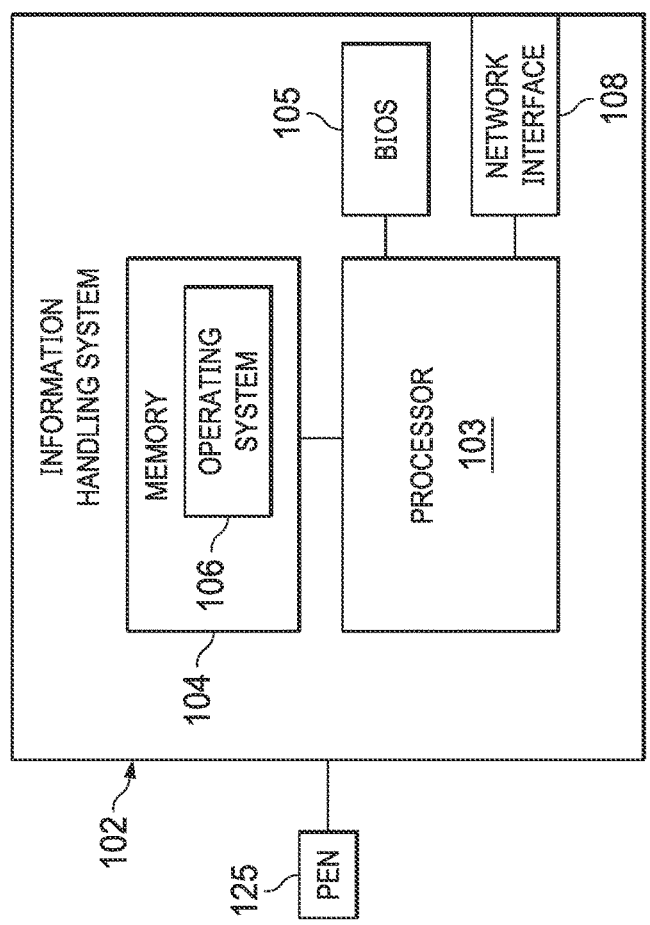
FIG. 1 illustrates a block diagram of an example information handling system, in accordance with embodiments of the present disclosure.

Preferred embodiments and their advantages are best understood by reference to FIGS. 1 through 3C, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile and/or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

In some embodiments, information handling system 102 may include pen 125 as an input device. Pen 125 may be an active pen, configured to interact with a surface such as a tablet or a screen (e.g., a touch screen) of information handling system 102. In some embodiments, pen 125 may be configured to dock with a particular location of information handling system 102 for recharging. For example, pen 125 and/or a chassis of information handling system 102 may include magnets therein to facilitate such docking. In embodiments in which information handling system 102 is a laptop system, the docking location may include a recess along an interface between a keyboard portion and a display portion of information handling system 102. In these and other embodiments, different docking locations may also be used.

Figure 2:
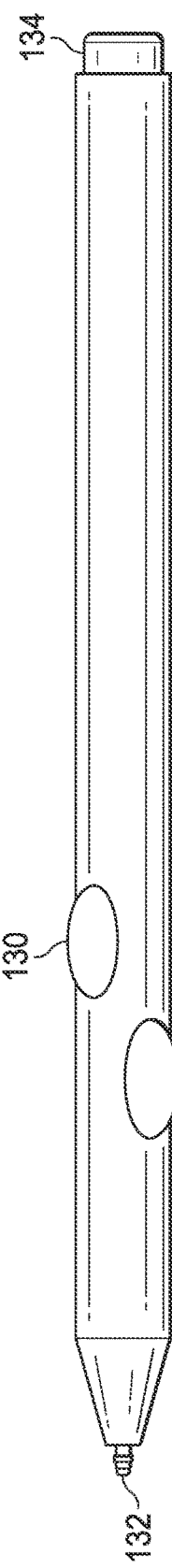
FIG. 2 illustrates an example electronic pen, in accordance with embodiments of the present disclosure.

Turning now to FIG. 2, an example embodiment of pen 125 is shown. Pen 125 may include a body portion with grip pads 130, which may facilitate the removal of pen 125 from its docking slot and may be disposed in positions that are natural for a user's fingers. For example, in the embodiment shown, pen 125 includes a frontal grip pad 130 for a user's index finger and a rear grip pad 130 for a user's thumb. In other embodiments, different numbers and placements of grip pads 130 may be used. Pen 125 and grip pads 130 may be constructed in any suitable size for user comfort. For example, pen 125 may have a length of approximately 140 mm and a diameter of approximately 11 mm, and grip pads 130 may be constructed as ovals with a size of approximately 10×8 mm.

Grip pads 130 may be constructed of any suitable material, such as plastic, metal, rubber, etc.

In some embodiments, grip pads 130 may protrude from the cylindrical surface of pen 125 by a desired amount (e.g., 4 mm). In other embodiments, grip pads 130 may be flush with the surface of pen 125 or may even be recessed into such surface.

One or more of grip pads 130 may also include a biometric sensor such as a fingerprint sensor, which may be used for various security features as discussed herein. For example, a fingerprint sensor may be disposed in the grip pad 130 that is contacted by a user's index finger. In other embodiments, a fingerprint sensor may be disposed in the grip pad 130 that is contacted by a user's thumb. In yet other embodiments, fingerprint sensors may be disposed in more than one grip pad 130 to determine multiple elements of biometric information of the user.

In some embodiments, pen 125 may also include a tip 132 for interacting with a screen and a button 134 to allow a user to perform interactions (e.g., mouse clicks) as desired.

The capability of pen 125 to detect biometric information from the user may allow for several advantages. For example, pen 125 may store a biometric profile for each of a plurality of users. This may allow for different default settings (e.g., a favorite color, width, pen type, hotkeys, etc.) for different users on a single active pen. In these and other embodiments, such profiles may be stored centrally on information handling system 102 to allow for a user to use different pens while retaining such default settings.

The ability to determine the user's identity quickly and seamlessly may also allow for features in which multiple users use different pens simultaneously. For example, teachers and students may work together with two or more pens on one display. Or two painters may draw and design on one model simultaneously. Or a team of users may brainstorm for real-time ideation, creation, and collaboration. Multiple people can draw on the display at the same time, and pen 125 may save the history of each drawing action for each different user.

In some embodiments, pen 125 may easily and intelligently connect to information handling system 102 with user preferences and settings automatically loaded when a particular users holds it (e.g., after the first time that user has used the pen and established a user profile). Different users may work together without delay, distraction, or slowing down: pen 125 may know who the users are, and multiple people can ink on the display at the same time. Further, pen 125 and/or information handling system 102 may record everyone's pen workflow. The history may be saved and replayed, indicating who wrote and drew which portions.

Pen 125 may also be used for several purposes relating to user identity, such as securely logging into a system (e.g., an operating system), securely granting access to a file, generating secure electronic ink signatures, generating secure electronic ink art designs and/or writing to aid in preservation of copyright rights, etc. For example, pen 125 may store a record that proves which individual created a digital artwork, which may be useful in copyright disputes.

In some embodiments, pen 125 may monitor the biometric sensor in real-time or near real-time in order to maintain accurate information about which user is currently using the device. By combining this information with time and date information, any cryptographic processing carried out by pen 125 may include assurances that the current user is the one who is creating a signature or carrying out other specified tasks.

In some embodiments, pen 125 may be used to quick-launch various files and/or applications. For example, a user may be able to designate different actions to be taken for each finger that rests on a biometric sensor, such that holding pen 125 in a particular hand and a particular orientation, then depressing button 134 may execute a desired function.

In another embodiment, a user may use pen 125 as an authentication mechanism in order to unlock a file for editing. The user may then use pen 125 to draw a signature into the file, and the file may then be encrypted (e.g., with the user's public key). In these and other embodiments, data from pen 125 such as the user's fingerprint and the signature stroke data related to the characteristics of the way the user physically draws a signature (which may indicate the coordinates, size, direction, speed, movement, pressure, stroke shapes, hovering characteristics, and/or any other data for each component of the signature) may be embedded into the file as metadata, and the file may be signed cryptographically (e.g., with the user's private key). Accordingly, pen 125 may enable many different features that are useful in the field of authentication, cryptography, and signing.

As one of ordinary skill in the art will appreciate, it is desirable to validate the identity of a user when accepting a digital signature. Current solutions generally require the use of a password or a third-party digital ID and PIN to validate the signer's identity, and then the signature and document may be encrypted/digitally signed with a timestamp. But the need to install additional applications or use phone messages to verify the signer's identity is inconvenient. Further, this has heretofore not been a real-time process for verifying the signer's identity at the moment of the signature, with the consequence that a signature can be created by untrusted people in some cases.

Accordingly, embodiments of this disclosure may improve on existing solutions by enabling real-time attestation. When the user holds pen 125 and signs a document offline, the ink signature generation algorithm may contain biometric and date/timestamp information that contributes to the legal status of the signature. Data embodying the ink signature may be combined with data from the document and encrypted to create a unique hash that is usable as a cryptographic certificate for verification purposes. As one of ordinary skill in the art with the benefit of this disclosure will appreciate, the cryptographic certificate may be created using any desired hash function and/or algorithm. For example, MD5, SHA-1, SHA-2, SHA-3, Whirlpool RIP-EMD-160, BLAKE, BLAKE2, BLAKE3, etc. are examples of cryptographic hash functions that may be used in some embodiments.

Thus it may be impossible to copy a valid ink signature from one document to another or sign a document by untrusted people.

In an online context, a network verifier may also be used to enhance the process discussed above to provide additional safety and speed. For example, authentication and verification of a signer's identity and approval of the signature may take place in real time. This may simplify compliance and keep business moving no matter whether users are at home or abroad.

As noted above, pen 125 may allow for various elements of data to be combined and encrypted for security purposes. For example, electronic signature information may be combined with fingerprint information (which may be captured in real-time), time/date data, signature stroke data, etc. to provide enhanced security assurances.

In some embodiments, a process for setting up pen 125 may include the following steps. Pen 125 may couple to information handling system 102 through any suitable communications medium (e.g., Bluetooth, WiFi, etc.). Information handling system 102 may then load a biometric driver (e.g., a fingerprint driver). Pen 125 may collect the biometrics of the active user and store a local profile in its internal memory. A system profile may then be created for the user on information handling system 102, which may include user preferences and other settings.

In some embodiments, a process for automatically pairing pen 125 with a user may include the following steps. Pen 125 may couple to information handling system 102. The user may then place a finger on a fingerprint reader of pen 125. Pen 125 may then capture a fingerprint image, verify the user's identity, and load the appropriate user profile and pen settings.

In some embodiments, a process for encrypting a digital signature may include the following steps. Pen 125 may couple to information handling system 102. The user may then place a finger on a fingerprint reader of pen 125 while drawing a signature on the screen. Pen 125 may capture a fingerprint image that is correlated in time with the act of drawing the signature on the screen. The fingerprint may be verified to identify the user. Then a unique hash and certification may be generated based on the fingerprint, the drawn signature, the timestamp, and any other suitable data. This hash value may then be used by other parties to verify that the user in question was the person who carried out the signing process.

Figure 3A:
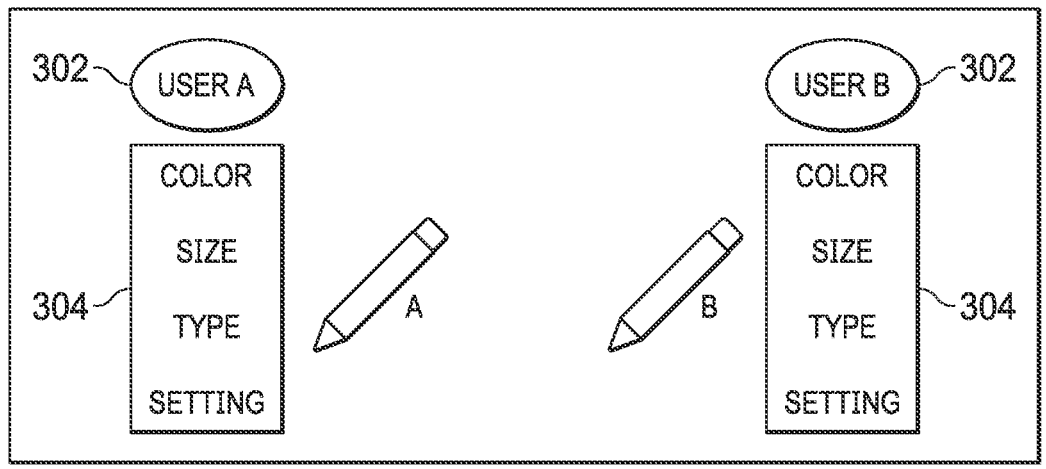
FIGS. 3A, 3B, and 3C illustrate example user interface elements, in accordance with embodiments of the present disclosure.
Figure 3B:
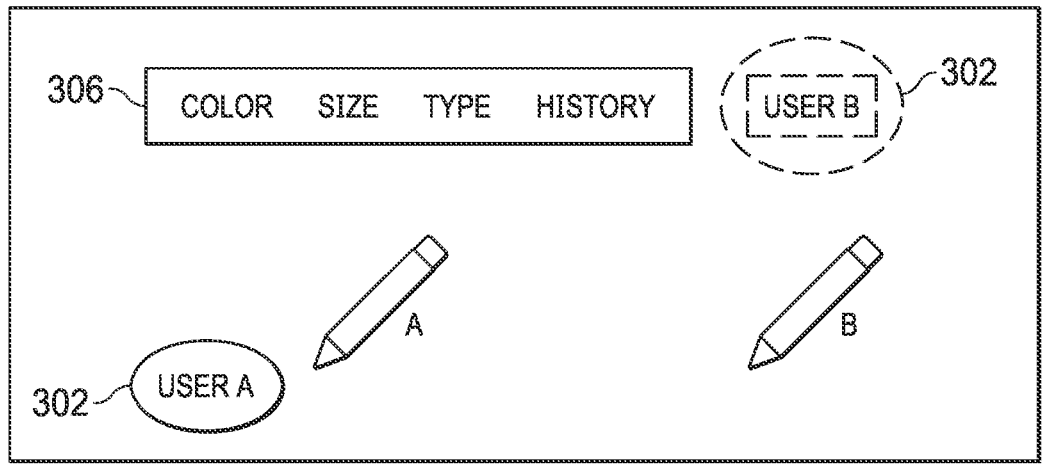
Figure 3C:
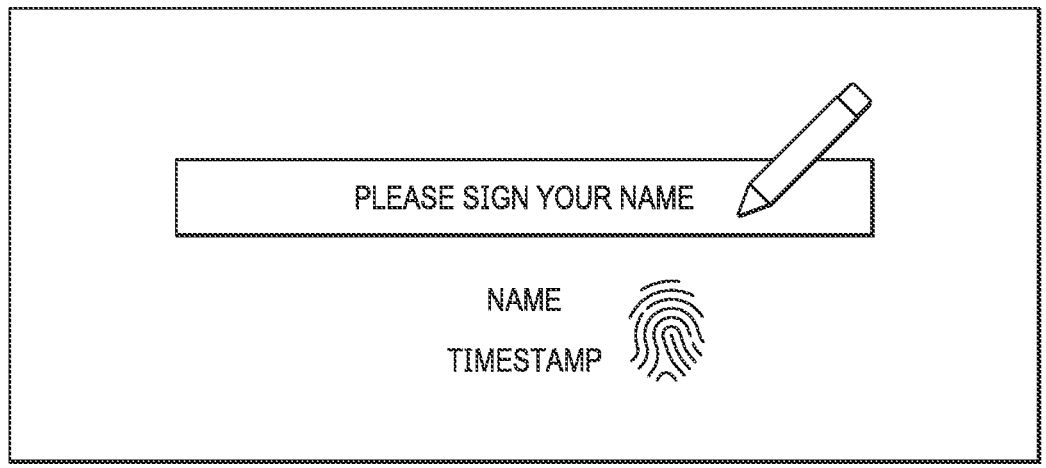

Turning now to FIGS. 3A-3C, some example user interface elements are shown.

In FIG. 3A, a graphical user interface (GUI) is shown for changing a color profile and pen settings. When one or more pens connect to the system, biometric sensors of such pens may identify the users that are holding them. For each pen, a user identifier 302 (e.g., including a user photo and/or a user name) may be displayed. The user may then click user identifier 302, and dropdown menu 304 may be displayed. Dropdown menu 304 may then be used to change any of various color profile and pen settings.

In FIG. 3B, a GUI is shown of multiple users (e.g., two users) working together. User identifiers 302 may be moved to any desired location in the GUI, and they may also be hidden if desired (as is shown with User B). Further, a shared menu 306 may be shown that is accessible by either user.

In FIG. 3C, a GUI is shown for providing an electronic ink signature. The user may draw an electronic signature in the location indicated, and a fingerprint (or other biometric identifier) may be captured simultaneously. The captured fingerprint may be displayed visually in some embodiments near the signature, or it may be invisible in other embodiments. The user name and timestamp may also be captured, and they may also be displayed visually or hidden.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a computer-readable medium having instructions thereon that are executable by the at least one processor for:
   communicatively coupling to an electronic pen;
   receiving, from the electronic pen, stroke data indicative of content drawn by a user with the electronic pen, wherein the content is associated with a document and is a drawing of a signature of the user, and wherein the stroke data includes coordinates, size, direction, speed, pressure, shape, and hovering characteristics for each of a plurality of strokes of the signature;
   receiving, from the electronic pen, biometric data associated with the user, wherein the biometric data is collected via one or more grip pads of the electronic pen contemporaneously with the content being drawn;
   receiving, from the electronic pen, timestamp data indicative of a time at which the content was drawn; and
   creating a cryptographic hash based on the stroke data, the biometric data, the timestamp data, and information from the document, wherein the hash is usable to create a cryptographically signed version of the document, and wherein the cryptographic hash is not usable to cryptographically sign a different document that contains different information.

2. The information handling system of claim 1, wherein the content is copyrightable digital content.

3. The information handling system of claim 1, further configured to load a profile associated with the user based on the biometric data.

4. The information handling system of claim 1, wherein the biometric data includes one or more fingerprint images.

5. An electronic pen apparatus comprising:
a body portion;
a tip portion; and
one or more grip pads disposed on the body portion;
wherein the electronic pen apparatus is configured to:
couple to an information handling system;
transmit, to the information handling system, stroke data indicative of content drawn by a user with the electronic pen, wherein the content is associated with a document and is a drawing of a signature of the user, and wherein the stroke data includes coordinates, size, direction, speed, pressure, shape, and hovering characteristics for each of a plurality of strokes of the signature;
transmit, to the information handling system, biometric data associated with the user, wherein the biometric data is collected via one or more grip pads of the electronic pen contemporaneously with the content being drawn; and
transmit, to the information handling system, timestamp data indicative of a time at which the content was drawn, wherein the information handling system is configured to create a cryptographic hash based on the stroke data, the biometric data, the timestamp data, and information from the document, wherein the hash is usable to create a cryptographically signed version of the document, and wherein the cryptographic hash is not usable to cryptographically sign a different document that contains different information.

6. The electronic pen apparatus of claim 5, wherein the content is copyrightable digital content.

7. The electronic pen apparatus of claim 5, further configured to load a profile associated with the user based on the biometric data.

8. The electronic pen apparatus of claim 5, wherein the biometric data includes one or more fingerprint images.

9. An article of manufacture comprising a non-transitory, computer-readable medium having computer-executable code thereon that is executable by a processor of an information handling system for:
communicatively coupling to an electronic pen;
receiving, from the electronic pen, stroke data indicative of content drawn by a user with the electronic pen, wherein the content is associated with a document and is a drawing of a signature of the user, and wherein the stroke data includes coordinates, size, direction, speed, pressure, shape, and hovering characteristics for each of a plurality of strokes of the signature;
receiving, from the electronic pen, biometric data associated with the user, wherein the biometric data is collected via one or more grip pads of the electronic pen contemporaneously with the content being drawn;
receiving, from the electronic pen, timestamp data indicative of a time at which the content was drawn; and
creating a cryptographic hash based on the stroke data, the biometric data, the timestamp data, and information from the document, wherein the hash is usable to create a cryptographically signed version of the document, and wherein the cryptographic hash is not usable to cryptographically sign a different document that contains different information.

10. The article of claim 9, wherein the content is copyrightable digital content.

11. The article of claim 9, wherein the code is further executable for loading a profile associated with the user based on the biometric data.

12. The article of claim 9, wherein the biometric data includes one or more fingerprint images.

\* \* \* \* \*